R. ALTOP.
NUT LOCK.
APPLICATION FILED JAN. 11, 1912.
1,063,763.
Patented June 3, 1913.
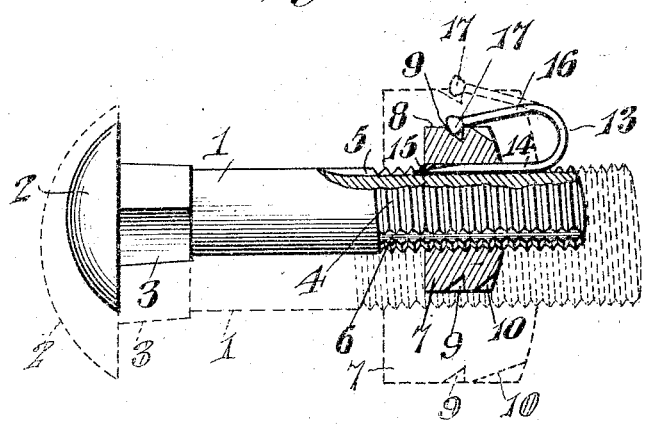
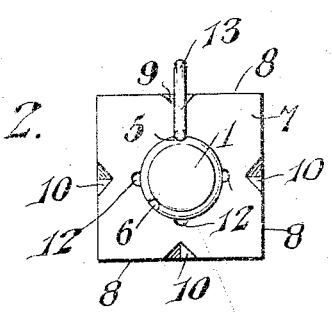
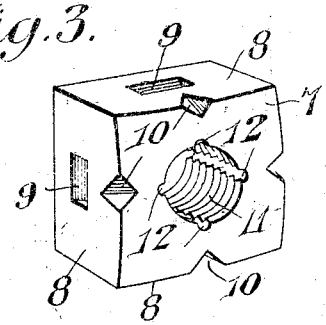
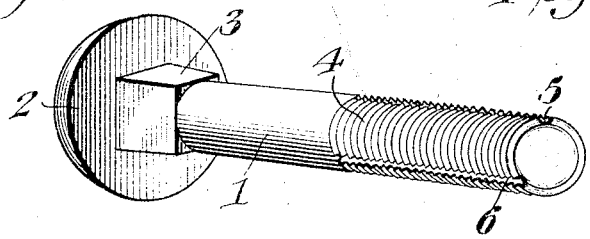
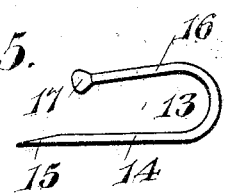
Ray Altop, Inventor
Witnesses

UNITED STATES PATENT OFFICE.

RAY ALTOP, OF COLUMBUS, MONTANA, ASSIGNOR OF ONE-HALF TO HARRY L. RAIFF, OF COLUMBUS, MONTANA.

NUT-LOCK.

1,063,763.   Specification of Letters Patent.   Patented June 3, 1913.

Application filed January 11, 1912.  Serial No. 670,679.

*To all whom it may concern:*

Be it known that I, RAY ALTOP, a citizen of the United States, residing at Columbus, in the county of Yellowstone and State of Montana, have invented a new and useful Nut-Lock, of which the following is a specification.

This invention relates to nut locks, and has for its object the provision of means for preventing with certainty the working loose of nuts from bolts.

A further object of the invention is a nut lock which shall be particularly efficient in operation, and at the same time simple and inexpensive.

The invention as thus outlined and as particularly set out in the appended claim will be readily understood from the following detailed description, taken in connection and with reference to the accompanying drawings illustrating one embodiment of the same.

In this drawing: Figure 1 is an elevation, partly in section, showing the invention embodied in a small size bolt and nut, and also indicating in dotted lines the application of the same locking pin to a bolt and nut of larger size. Fig. 2 is an end view of Fig. 1. Figs. 3, 4 and 5 are, respectively, detail perspectives of a nut, bolt and locking pin constructed according to my invention.

Having detailed reference to the drawing, 1 is a bolt provided with the head 2 and a square shoulder 3, and having the usual threaded portion 4 provided with two longitudinal grooves 5 and 6, said grooves being angularly displaced about the periphery of the nut to a degree corresponding to an aliquant part of said periphery, in the present case being shown as separated a distance corresponding to five-eighths of the periphery.

The polygonal nut 7 is represented as having in the present instance four facets 8 each provided in its medial portion with a recess 9 and in its front edge with a notch 10 in line with said recess. The threaded bore 11 of the nut is provided at equally spaced intervals with the grooves 12, each of which is arranged radially of the nut in line with one of the notches 10 and one of the recesses 9.

A locking pin 13 is provided of spring steel wire. This pin is substantially U-shape in cross section and has one leg 14 provided preferably with a point 15 and the other leg 16 provided with a terminal knob or head 17, the leg 14 arranged to lie within the cylindrical bore formed by two of the opposing grooves 5 and 12 when the nut is in position upon the bolt, and the knob or head 17 arranged to lie within and in frictional engagement with the walls of one of the recesses 9. The locking pin is curved outwardly from the bolt in a direction transversely thereof in advance of the nut, and it is extended backwardly from the curved portion in a direction longitudinally of the bolt to form the outer leg.

I am aware that it is not new to provide a bolt with a plurality of longitudinal grooves and a nut with recesses in its facets and with grooves in the wall of its threaded bore, and to lock the nut and bolt together by a pin lying within the opposing grooves and having its head bent into engagement with a recess, but my invention resides in certain peculiarities of construction and arrangement of the several parts which will now be described more particularly.

The pin 13 is, as stated, of spring metal and is made of a size and of a shape which adapts it to be used interchangeably with nuts and bolts of divers sizes within a wide range, as indicated in Fig. 1, and to be readily slipped into place in either case by the fingers alone, the notches 10 providing a beveled approach over the edge of the nut to the recesses 9, so that if the point 15 of the pin is entered within the space formed by the two opposing grooves, the continued inward pressure will cause the head of the pin to ride up the incline of the notch 10 and drop into the recess. Moreover, it will be observed from Fig. 1 of the drawing that the engagement between the head of the pin and the walls of the recess is a frictional one and upon an incline so that there is no positive locking action between the pin and nut, whereby the pin may be readily removed by slight force exerted thereon in a direction longitudinally of the bolt. Heretofore it has been usual to provide a non-resilient pin which is bent over into engagement with a recess, or a spring pin arranged to engage positively with a recess or over the rear edge of the nut, necessitating the prying of the pin out of the recess in a radial direction by means of some tool. This position of the grooves upon the bolt is also distinctive. In the present case it will be observed from

Fig. 2 of the drawing that when the groove 5 is brought into register with the upper groove 12, the groove 6 occupies a position midway between two of the other grooves 12, and it follows that if the nut be turned to bring the grooves 5 and 12 progressively out of register the grooves 6 will progressively approach nearer to one of the grooves 12 and the greatest distance which can under any circumstances intervene between one of the grooves 5 and 6 and a groove 12 corresponds to one-sixteenth of a turn. Consequently when the nut is screwed home against the parts to be secured together, a subsequent adjustment of the nut backwardly or forwardly to bring two of the grooves into register cannot under any circumstances exceed a one-sixteenth turn.

By the arrangement of the grooves with the particular relation to each other stated and the provision of the spring pin having a head arranged to engage frictionally with recesses in the facets of the nut and guided thereinto by the notches, a particularly efficient nut lock is provided which can be made at a very small expense and which by reason of the changeable pin adapted to be applied to various sizes of bolts without tools has a wide field of usefulness.

What is claimed is:—

In a nut lock, the combination of a polygonal nut having its facets provided with recesses and its threaded bore provided with a plurality of longitudinal grooves corresponding radially with the recesses, said nut being also provided at its front edges with notches arranged in line with the recesses and forming inclined guiding faces, a bolt arranged to receive the nut and provided in its threaded portion with a longitudinal groove with which the grooves of the nut are adapted to register, and a locking pin fitting in registering grooves of the nut and the bolt and curved outwardly from the latter in a direction transversely thereof in advance of the nut and extended backwardly in a direction longitudinally of the bolt to form an outer leg, the latter being provided with a terminal head to engage a recess of the nut and the locking pin being resilient to enable it to be applied to nuts of different sizes, and the said notches being adapted to receive the outer leg when the locking pin is applied to a relatively large nut.

In testimony, that I claim the foregoing as my own, I have hereto affixed my signature in the presence of two witnesses.

RAY ALTOP.

Witnesses:
PAT LAVELLE,
HARRY L. RAIFF.